(12) United States Patent
Code et al.

(10) Patent No.: US 12,340,387 B2
(45) Date of Patent: Jun. 24, 2025

(54) SYSTEM AND PROCESS FOR ELECTRONIC TOKENIZATION OF PRODUCT BRAND LOYALTY AND INCENTIVES

(71) Applicant: LOYYAL CORPORATION, New York, NY (US)

(72) Inventors: Shannon Code, Raleigh, NC (US); Sean Dennis, Earnley (GB); Gregory Simon, Beaufort, NC (US)

(73) Assignee: Loyyal Corporation, New York, NY (US)

( * ) Notice: Subject to any disclaimer, the term of this patent is extended or adjusted under 35 U.S.C. 154(b) by 0 days.

(21) Appl. No.: 15/433,107

(22) Filed: Feb. 15, 2017

(65) Prior Publication Data
US 2017/0236143 A1   Aug. 17, 2017

Related U.S. Application Data

(60) Provisional application No. 62/295,416, filed on Feb. 15, 2016.

(51) Int. Cl.
*G06Q 30/0226* (2023.01)
*G06Q 20/36* (2012.01)
*G06Q 20/38* (2012.01)

(52) U.S. Cl.
CPC ......... *G06Q 30/0226* (2013.01); *G06Q 20/36* (2013.01); *G06Q 20/387* (2013.01)

(58) Field of Classification Search
CPC ... G06Q 30/0226; G06Q 20/387; G06Q 20/36
USPC .......................... 705/14.1, 67, 14.46; 725/23
See application file for complete search history.

(56) References Cited

U.S. PATENT DOCUMENTS

| | | | |
|---|---|---|---|
| 6,862,575 B1 | 3/2005 | Anttila | |
| 2003/0236704 A1* | 12/2003 | Antonucci | G06Q 20/20 705/14.3 |
| 2008/0052169 A1* | 2/2008 | O'Shea | G06Q 30/02 725/23 |
| 2015/0088607 A1* | 3/2015 | Georgoff | G06Q 30/0202 705/14.46 |
| 2015/0348169 A1 | 12/2015 | Harris et al. | |
| 2016/0012424 A1* | 1/2016 | Simon | G06Q 20/36 705/67 |

OTHER PUBLICATIONS

Beam, Beam Wallet, 2015 (Year: 2015).*

* cited by examiner

*Primary Examiner* — Tarek Elchanti
(74) *Attorney, Agent, or Firm* — Goodwin Procter LLP

(57) ABSTRACT

A system and process to generate product brand loyalty and provide incentives at the agent-to-agent level of the supply network tree is disclosed. Exemplary embodiments provide a "dynamic coupon" which is a dynamic electronic file construct that includes a changing value associated with a product/service. The dynamic coupon improves for example the effectiveness of existing cashback coupon programs. The coupon may be integrated into a digital wallet, which may be provided to user members (for example agents in the supply chain) on a loyalty network. Each owner of a digital wallet may have dynamic coupons in their wallet that are accrued based on consumer activity with products or services they are involved with. The coupon may be product specific, attached directly to the finished consumer good/service.

6 Claims, 4 Drawing Sheets

SYSTEM AND PROCESS FOR ELECTRONIC TOKENIZATION OF PRODUCT BRAND LOYALTY AND INCENTIVES

CROSS-REFERENCE TO RELATED APPLICATION

This application claims benefit under 35 U.S.C. § 119(e) of U.S. Provisional Application having Ser. No. 62/295,416 filed Feb. 15, 2016, which is hereby incorporated by reference herein in its entirety.

FIELD

The subject disclosure relates to data processing for specific applications and more particularly to a system and process for electronically tokenizing product brand loyalty and incentives.

BACKGROUND

A supply chain is a relationship network tree representing a one way flow of physical value from the production base through branches and sub-branches until finished goods inventory reaches end consumption. The problem with physical value (for example, currency, commodities, etc.) is when it is moved it can be lost, stolen, damaged, spoiled, etc., resulting in wastage.

One approach to address flow of product is to offer loyalty rewards. A loyalty program rewards repeated loyalty to a merchant/service provider. For example, some programs offer cashback rewards which incentivizes a onetime burst of loyalty to a merchant, brand or service provider. Loyalty rewards use value to incentivize interaction between agents in a network, through relationship loyalty, resulting in a greater generation of value as "Loyalty Capital". "Loyalty Capital" is used herein as a term relating to the intrinsic value that can be attributed to relationships between entities in the supply chain of goods and services to the end consumer.

Another approach is to offer paper or electronic coupons. Conventional coupons are a direct producer-to-consumer cashback rewards program. Some known examples include Coca Cola's® points, but none can be defended as successful or effective beyond as a novel marketing campaign. Existing coupon technology is failing to generate Loyalty Capital for the producer, because it is just a cash back program, not a loyalty program. Consumers tend to be physiologically more loyal to the brand of the producer rather than that of the merchant.

Thus it may be asked why are there no product brand loyalty programs? The reasons are many. Product brand loyalty attempts to transfer value from one end of the supply chain all the way to the other end. It is a one agent to many, millions or even billions, agent relationship network tree. As may be appreciated, tracking and managing rewards under such a distributed network tree is difficult. The agent-to-agent relationships are the most inefficient, difficult to manage and operate point-to-point relationship and value transfer channels within the entire relationship network tree.

As can be seen, there is a need for a system and process to facilitate communication and value transfer channels efficiently or effectively enough for these relationships.

SUMMARY

In one aspect of the disclosure, a system providing electronic tokenization of product brand loyalty and incentives comprises a computer readable medium including a set of computer executable instructions for creating a virtual representation of a relationship network tree; a digital wallet associated with a user member in the relationship network tree; an electronic dynamic coupon file construct in the digital wallet, the electronic dynamic coupon configured according to a smart contract defined by rules stored in the form of an electronic token and including rules defining a dynamic value associated with a product or service, said rules defining criteria for adjusting the dynamic value based on an identified need to move the product or service associated with the dynamic coupon; and a host server on a distributed ledger network configured to update the digital wallet in response to identifying activity of the user member with a product identified as having a need to be moved and being associated with the dynamic coupon.

In another aspect, a computer program product provides electronic tokenization of product brand loyalty and incentives. The computer program product comprises a non-transitory computer readable storage medium having computer readable program code embodied therewith. The computer readable program code is configured, when executed by a computer processor, to: generate a digital dynamic coupon comprising a set of stored rules stored related to a liability value associated with a movement of a product or service, the set of rules including terms of a contract between an issuer and an agent in a supply chain relationship of the product or service; identify, by the computer processor, an event performed by the agent related to the movement of the product or service, the event being defined as satisfying one criteria within the set of rules; modify, by the computer processor, the liability value of the digital dynamic coupon in response to the identified event; and broadcast by a host server, to a network tree connected to the supply chain relationship, the modified liability value associated with the digital dynamic coupon.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

Generally, embodiments of the subject technology provide a system and process to generate tokenized product brand loyalty and in some embodiments, provide incentives at the agent-to-agent level of the supply network tree. Embodiments disclosed below generally exist within an electronic online environment. Exemplary embodiments provide an electronic feature herein referred to as a "dynamic coupon". Aspects disclosed herein may use the dynamic coupon as a mechanism to electronically track commercial related activity with the sale or disposal of a product or service. The dynamic coupon and the system managing such coupons solve problems long felt and related specifically to agent to agent relationships in a supply chain as well as generating product brand loyalty within the supply chain. In general, the dynamic coupon may provide electronically tracked credits that change in value. The credit associated with activity related to a product or service can be automatically tracked and loyalty to a brand may become measureable and quantifiable. Embodiments disclosed scale readily in tracking coupon value changes whether for a few agents in a chain or for a complex tree of agents which can be in the thousands or more.

Figure 1:
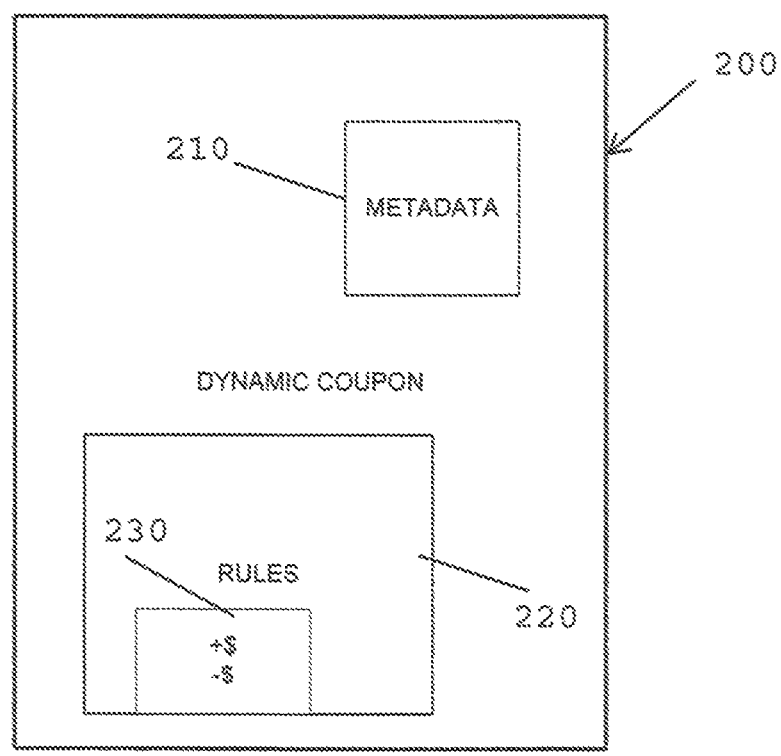
FIG. 1 is a block diagram representing a dynamic coupon in accordance with an aspect of the subject technology.

Referring now to FIG. 1, a schematic representation of a dynamic coupon 200 (sometimes referred to as the "coupon 200") is shown according to an exemplary embodiment. The dynamic coupon 200 is a dynamic electronic file construct that includes a changing value 230 associated with a product/service. The dynamic coupon 200 may exist within a supply network for tracking activity associated with individuals and their association with the movement (sales or disposal) of a product or service. The dynamic coupon 200 may include a set of software based rules 220 that control the change in the coupon value 230 based on criteria in the rules 220 being met as actions within a supply chain network are identified. In some aspects, the dynamic coupon 200 may represent a liability. The liability may be defined by the rules 220 stored in the form of an electronic token. The rules 220 may form a contract with the ability of the terms within the contract being dynamic and able to change automatically based on criteria being met and identified in the system. As described herein, the token may have tangible value (which may be fungible or non-fungible) that can appreciate/depreciate depending on the activity of agents in a token tree. The token and its contents may be configured to remain static or self-modify based on criteria within the rules being met.

An example of pseudocode assembling the liability and its pre-defined rules into a digital token is provided as follows:

```
"Token Model (definition) {
Name: _____
Divisible to ____ units
Creator: _____
Owner: _____
Balances: Array(agent,balance)
Created Date: _____
Expiry Date: _____
```

```
Associated Rules: array(rules)
function getBalance( )
function transferOwnership( )
}
```

The above pseudocode is an example of a token model. For individual "tokens" one or more parties cryptographically "sign" the unique contract after fields have been filled in and the resulting code is converted to "hexadecimal"

This provides a "signed" transaction in electronic form which can be immediately (or at a later date) "broadcast" into the supply chain network. A reference to this unique token can be known ahead of time or may be provided by the network after submission and acceptance.

In operation, if a product isn't selling well in the general marketplace, the original distributor may attach a dynamic coupon 200 to the product as an electronically tokenized incentive for downstream agents to move the product. The rules 220 may include values for the time it takes to sell units of the product and the volume of units sold. Thus, the dynamic coupon's token value 230 may increase with the number of units sold and simultaneously may have an intrinsic time value decreasing as days pass until the expiration of the coupon occurs. In another example, a dynamic coupon 200 may be setup to promote a product giveaway by the end retailer (agent). The end retailer is thus given an incentive and compensation to dispose of the product which saves the agents upstream from the retailer costs in having to retrieve unsold merchandise, restock, and/or destroy unsold product. As may be appreciated, the manufacturer, retailer and end consumer all benefit from the incentive to promote movement of the product or service which builds up end to end loyalty in the product or service.

Events trigger actions on a tokenized dynamic coupon 200. Some events include activity related to the sales or disposal of a product or service as described above. Events can happen within the network or triggered by some external mechanism (API call, system call). Events may trigger for example, a change in the properties of a token, adjustment in value, a transfer in ownership, an assignment of new properties, an addition or adjustment of new owners, and/or an addition, removal or adjustment of rules. Events may destroy tokens as well. For example, if available product reaches a threshold minimum (or zero) and there is no longer an need to incentive movement or a reward budget has reached its limit. The parts of a token that are allowed to be modified or interacted with may be specified at the token's creation. The token may also restrict modifications, preventing the owner and/or creator from adjusting all or some properties of the token. Rules can define how the tokenized liability as an asset comes into existence, how it's disposed of, how it is tracked across space and time or any number of simple or complex rules. These rules may be designed in a way that can be reusable by other tokenized liabilities. In some embodiment, changes to the rules may be built-in for automatic modification over the history of the token or its evolution. In other embodiments, the rules may be static or open-ended for change at a later date.

As will be appreciated, the dynamic coupon 200 improves the effectiveness of existing cashback or reward based coupon programs. The coupon 200 may be integrated into a digital wallet, or private electronic keys granting access to a digital wallet. In some embodiments, the dynamic coupon 200 may include metadata 210 related to the agent including for example identification of the agent, activity related to the product/service associated with the dynamic coupon 200, the current product or service of the dynamic coupon 200, any other agents downstream/upstream from the coupon holder involved in the movement of a product or service, and the current status of the dynamic coupon 200 (for example, live or unexpired). As criteria in the rules 220 are met, the metadata 210 may be updated. The digital wallet/electronic key(s) storing a dynamic coupon 200 may be available on a loyalty network. Each owner of a digital wallet may have one or more dynamic coupons 200 in their wallet that are accrued based on consumer activity with products or services they are involved with. The coupon 200 may be product specific, attached directly to the finished consumer good/service.

Figure 2:
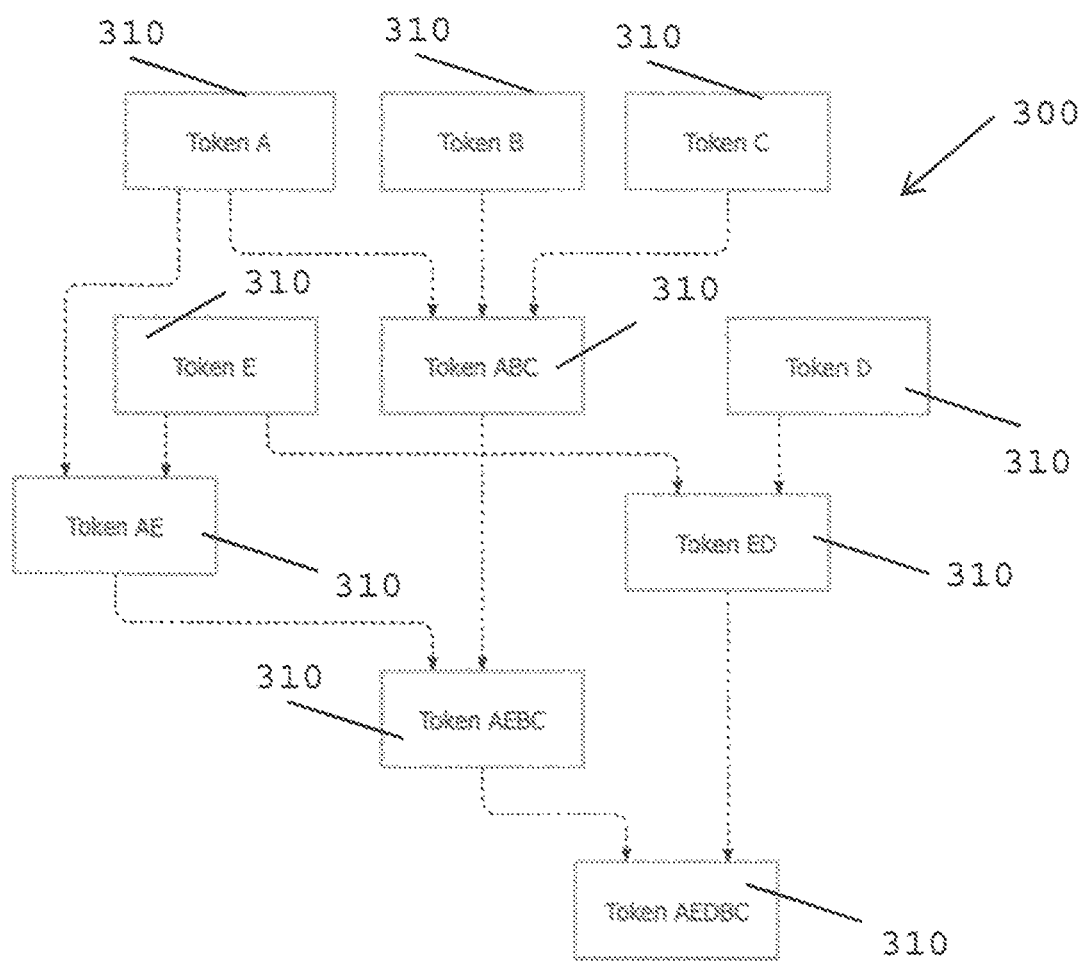
FIG. 2 is a block diagram of a token tree in accordance with an aspect of the subject technology.

Referring now to FIG. 2, in one embodiment, a system may implement an electronic token tree 300, which maps a virtual representation of an existing supply chain agent relationship infrastructure. The system tracks activity throughout the token tree 300 and identifies digital wallets 310 and dynamic coupons (represented as a "Token") related to goods and services within the token tree 300. In some embodiments, the token tree 300 is hierarchical. For example, the value of each digital wallet 310 at the topmost level may depend on the activity of agents represented by digital wallets 310 lower down the token tree 300. Assuming each downstream agent has the same amount of activity, the digital wallet 310 associated with "Token A" has four downstream agents and thus would have more value than the digital wallets 310 associated with "Token B" and "Token C" respectively which each have three downstream agents. "Token E" which has three downstream agents may have more value than "Token D" which has two downstream agents.

While the above was described in a unilateral relationship, some embodiments of the token tree 300 system provide multidirectional and multilateral dynamic flow of fungible or non-fungible value. An exemplary embodiment of the token tree 300 utilizes blockchain architecture and a distributed ledger to track transactions. As may be appreciated, a blockchain based system protects against incongruities among transactions within the token tree 300 network. Data integrity may thus be preserved so that the value of the dynamic coupons 200 and distribution of rewards is harmonized throughout the supply chain relationships.

Figure 3:
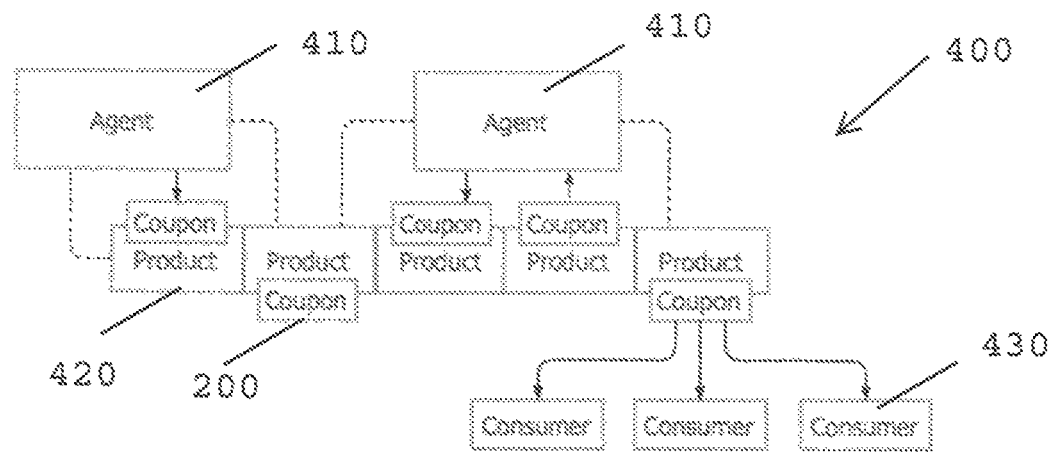
FIG. 3 is a flowchart of a general supply chain relationship in accordance with an aspect of the subject technology.
Figure 4:
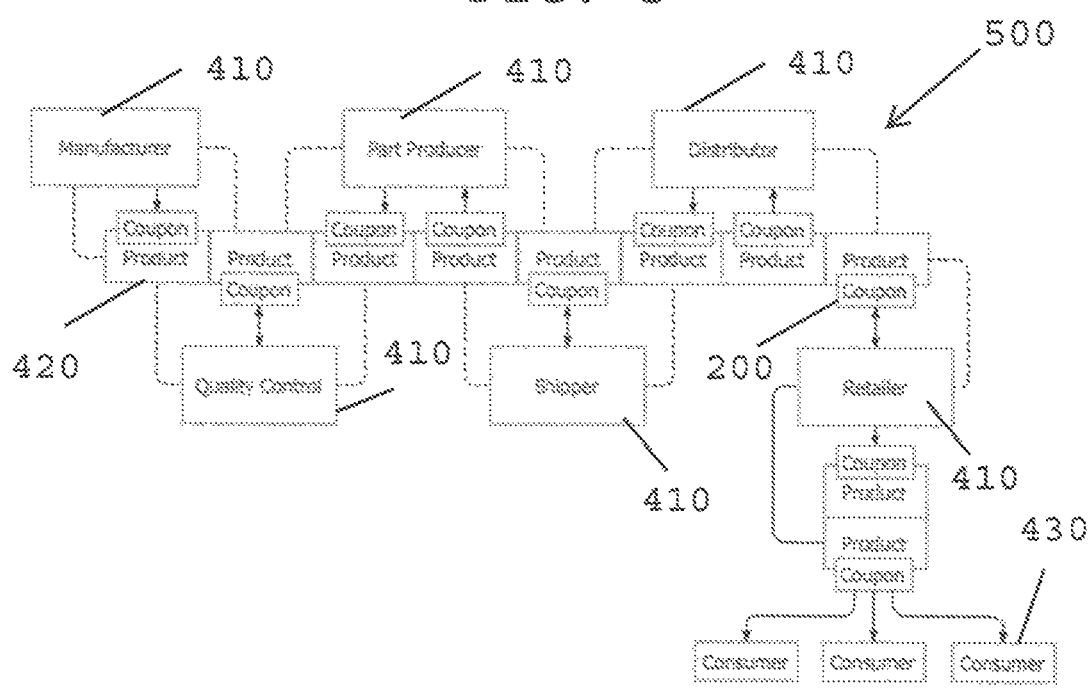
FIG. 4 is a flowchart of a detailed supply chain relationship in accordance with an aspect of the subject technology.

Referring now to FIGS. 3 and 4, example of a general supply chain 400 and detailed supply chain 500 relationship are shown according to exemplary embodiments. The supply chain 400 generally includes one or more agents 410 serving roles for moving products 430 to end consumers 430. In exemplary embodiments, agents 410 that wish to participate in the incentive based relationships may register as user members in an online hosted portal. Dashed lines represent a connection of an agent 410 to the product supply chain. Agents 410 contribute in some way to the manufacture or distribution of a product 420 within the supply chain 400. Embodiments of the present disclosure may attach a dynamic coupon 200 to one or more of the products 420. Arrows between an agent 410 and a coupon 200 may represent which coupons 200 have some value associated with the agent 410's activity with the associated product 420.

The supply chain 500 provides a more detailed example of a supply chain relationship. The agents 410 may be for example, a manufacturer, a part producer, a distributor, a quality control department, a shipper, or a retailer. Any of the agents 410 may load or apply a coupon value to a dynamic coupon 200 attached to a product 420 from their respective position in the supply chain. Similarly any agent 410 may claim coupon value from any other upstream agent 410, either horizontally or vertically of their own position assuming the coupon's criteria allow for redemption by that agent 410. Agents 410 who contribute to the manufacturing or delivery of a product 420 may (based on rules applied by agents up-stream) add value to dynamic coupons, consume part of the value, or consume the entire coupon 200. This enables agents 410 to incentivize down-stream behavior at any point along the supply chain 500. It also enables multiple agents 410 to contribute to the same coupon for a consumer 430.

It will be understood that the positions of agents 410 shown in the diagram does not necessarily imply any direct or indirect relationship beyond contributing in some way to a product's supply chain lifecycle. The diagram illustrates that there are a minimum of two agents 410 contributing to the manufacturing or delivery of a product 420, which is ultimately delivered for consumption by consumer 430 agents who do not contribute to the manufacturing or delivery of the product.

It will be appreciated that there exists a great complexity in the electronic logic needed to provide an operable incentive within a supply chain agent relationship network. Traditionally, it is a challenge in itself to define value for the activity needed to provide incentive for agents. The subjectivity in setting a value would inevitably lead to obviously mispriced incentives. It would be unduly burdensome and cost prohibitive to manually provide a starting value for an incentive and then manually adjust it as agents participate or show lack of interest in the incentivized activity. Aspects of the system using smart contract technology will allow each agent in the network to observe goods through different factors, such as a set of beliefs, values, emotions, knowledge, etc. Accordingly, their respective behavior will demonstrate tangible value based activity by responding to their interest in the value provided by the offered dynamic coupons.

In some embodiments, the value of dynamic coupons changes under certain criteria. The value balances for all items can be controlled from one central location (for example a server as described below), regardless of where the item may be. The value balances for each coupon item can be individually increased or decreased any number of times, instantly and at no cost. Software embodiments in the system may provide dynamic rules defining how the value balance in each wallet will adjust. The rules may be embedded within the electronic files of the coupon itself and automated allowing for the simple operation of complex logic. In another embodiment, the value associated with a dynamic coupon may automatically adjust according to pre-set rules if the incentive for the coupon does not generate a minimum threshold of activity. The reward or compensation for activity may automatically adjust upward until response in the supply chain reflects sufficient activity in movement of the product or service. Sufficient activity may be based on a pre-set number of units sold. For example, the system quantifies the value by attaching formulas into the dynamic coupons which may aggregate the amount of the user's direct activity with a product or service at various times along with the activity of agents downstream from and connected to the user's activity. As a product's inventory changes the value of the dynamic coupon may change to reflect a need to accelerate/decelerate product movement. For services, as the volume of services rendered or subscribed for changes, the value of the dynamic coupon may change reflect a need to accelerate/decelerate services offered.

For example, a dynamic coupon with a cashback characteristic may include a balance which can be increased as the product nears the expiration date, such as a bottle of mayonnaise. The merchant may thus have incentive to increase efforts to sell the item. A merchant's wallet may be charged with up to 100% of the purchase price and still be economically advantageous for the manufacturer, as the incentive successfully avoids the costs of retrieving and disposing of the otherwise unsold wasted item. More consumers experience greater satisfaction as the one previously fixed price point is now a dynamic pricing scale customized exactly for each individual consumer no matter where they may fall along that scale. As may be appreciated, there is value saved from reduced wastage which becomes increased profits for the producer, improved satisfaction for the consumer, and greater loyalty capital between all agents involved.

Dynamic coupons for supply chain management are usable as tool to provide value based incentives to accelerate consumption of inventory at the very end of the supply chain. Embodiments may further expand this concept to provide active incentives to all agents within the supply chain relationship network, regardless of who they are or where they are a in supply chain loyalty program. The dynamic coupon creates multidirectional value flow in the relationship network tree. In addition to producer to consumer value flow, aspects of the dynamic coupon disclosed introduce consumer to producer value flow, providing value flowing back up the supply chain. Aspects also change previously static activity and provide electronic tokenization of non-fungible value (feedback) into fungible value which now can be transferred frictionless through the relationship tree in any direction between any agents. Thus, aspects of the dynamic coupon give incentive to other agents higher up in the supply chain to also receive value for moving products/services. Other agents may include for example: supply chain managers, subsidiaries, wholesalers, delivery services, retail merchant, and consumers. For example, manufacturers of some products (consumer electronics for example) have agreements with retailers to accept all returns of defective items. Retailers have very loose rules related to returns. This means that a manufacturer might have interest in consumers interacting directly with the manufacturer so they can minimize waste. The embodiments disclosed herein can facilitate this desired behavior by offering incentives through the electronic tokens and tracking discussed above.

Figure 5:
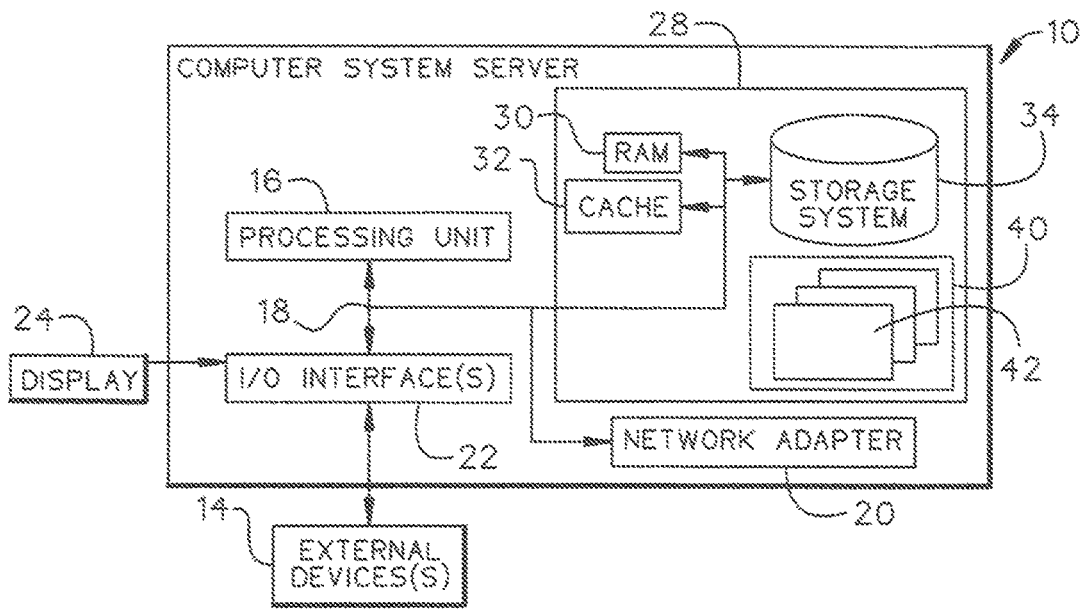
FIG. 5 is a block diagram of a computer/server system for providing brand product loyalty in accordance with aspects of the subject technology.

Referring now to FIG. 5, a schematic of an example of a computer system/server 10 is shown. The computer system/server 10 is shown in the form of a general-purpose computing device. As may be appreciated, reference to a computer system/server 10 (sometimes referred to as a "general computing machine") in the following description may refer to different machines depending on the role or function being performed. In addition, more than one computer system/server 10 may be present simultaneously, for example in the network 100 described more fully below. The computer system/server 10 may serve the role as the machine implementing for example functions related to creating an electronic representation of a network tree, creating a digital wallet, creating a smart contract, creating a dynamic coupon, defining dynamic rules and formulas for dynamic coupons, identifying a product or service related activity in the network tree, and adjusting value in a dynamic coupon. The components of the computer system/server 10 may include, but are not limited to, one or more processors or processing units 16, a system memory 28, and a bus 18 that couples various system components including the system memory 28 to the processor 16.

The computer system/server 10 may be for example, personal computer systems, tablet devices, mobile telephone devices, server computer systems, handheld or laptop devices, multiprocessor systems, microprocessor-based systems, set top boxes, programmable consumer electronics, network PCs, and distributed cloud computing environments that include any of the above systems or devices, and the like. The computer system/server 10 may be described in the general context of computer system executable instructions, such as program modules, being executed by a computer system (described for example, below). In some embodiments, the computer system/server 10 may be a cloud computing node connected to a cloud computing network (not shown). The computer system/server 10 may be practiced in distributed cloud computing environments where tasks are performed by remote processing devices that are linked through a communications network. In a distributed cloud computing environment, program modules may be located in both local and remote computer system storage media including memory storage devices. Some embodiments use a cloud computing environment to provide a blockchain architecture for implementation of a distributed ledger.

The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device typically called a "hard drive" (not shown). The system memory 28 may include at least one program product 40 having a set (e.g., at least one) of program modules 42 that are configured to carry out the functions of embodiments of the invention. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein. In some embodiments, a smart contract, and in particular a dynamic coupon may be in the form of a program module 42 and run on any computer system/server 10 described herein.

The computer system/server 10 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network (e.g., the Internet) via a network adapter 20. As depicted, the network adapter 20 may communicate with the other components of the computer system/server 10 via the bus 18.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Figure 6:
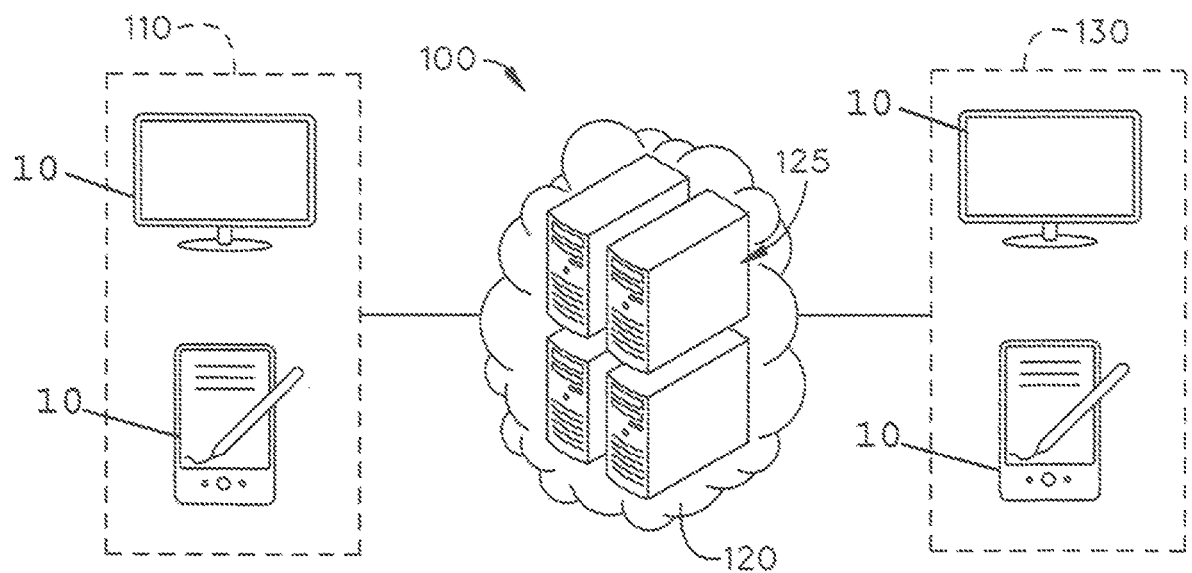
FIG. 6 is a block diagram of a system/network processing dynamic coupons in a supply chain agent relationship in accordance with an aspect of the subject technology.

Referring now to FIG. 6, the system 100 represents an exemplary embodiment of the token tree 300 (FIG. 2) in a supply chain agent relationship. The box 110 may represent an issuer (for example, a product manufacturer) of a dynamic coupon. The box 130 may represent for example an agent in the supply chain agent relationship. For sake of illustration, only a single agent box is shown. The devices 10 represent general computing devices that serve as interfaces for issuers and agents. A network 120 may include a server(s) 125 storing a software embodiment of the disclosed invention and acting as an intermediary or host providing the distributed ledger and blockchain environment for implementing transactions within the system. The server(s) 125 likewise may function for example, under the description of the general computing machine 10. Changes to a dynamic coupon in the system 100 may be read, detected, and updated within the server(s) 125. Statistics related to performance of dynamic coupons may be stored and updated within the server(s) 125.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Those of skill in the art would appreciate that various components and blocks may be arranged differently (e.g., arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. For example, while the foregoing was described in the context of a rewards or redemption program and associated liabilities, it will be understood that other applications may use aspects of the subject technology to track information and assess changing value as provided by the system and processes disclosed.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A system comprising:
a digital wallet associated with a user member in a relationship network tree, wherein the relationship network tree includes a plurality of agents that hold different positions in a flow of a product or service from manufacturing to a sale of the product or service to an end consumer;
an electronic dynamic coupon in the digital wallet, the electronic dynamic coupon configured according to a smart contract and having rules defining a dynamic value of the electronic dynamic coupon associated with the product or service, wherein the dynamic value automatically adjusts according to the rules when an incentive for the electronic dynamic coupon does not generate a minimum threshold of change in movement of the product or service, wherein the dynamic value is loaded by two or more of the plurality of agents;
a token tree that maps a virtual representation of a supply chain agent relationship infrastructure for the plurality of agents in the relationship network tree and allows to track activity throughout the token tree and to identify dynamic coupons within the token tree; and
a host server on a distributed ledger network configured to update the digital wallet in response to identifying an event relating to a product identified as having a need to be moved and being associated with the electronic dynamic coupon,
wherein based on agent instructions from an agent of the plurality of agents, the host server increases the dynamic value of the electronic dynamic coupon to incentivize down-stream agent behavior in the relationship network tree;
wherein based on down-stream agent instructions from a down-stream agent, the host server further increases the dynamic value of the electronic dynamic coupon to incentivize a consumer to purchase the product or service;
wherein the distributed ledger network tracks electronically a commercial activity of the agent and the down-stream agent using the token tree;
wherein updating the digital wallet includes instantly broadcasting the further increased dynamic value of the electronic dynamic coupon to the relationship network tree so that the agents have up-to-date value information of the electronic dynamic coupon;
wherein updating the digital wallet includes automatically destroying one or more associated tokens in the distributed ledger network when availability of the product or service reaches a threshold;
wherein the system provides a multidirectional incentive program that includes upstream and downstream agents, which add values to the digital wallet; and
wherein the plurality of agents are upstream or downstream of each other in the flow of the product or service from manufacturing to sale to an end consumer and a value of an electronic dynamic coupon for an agent upstream of other agents is an aggregate of values for electronic dynamic coupons associated with the other agents.

2. The system of claim 1, wherein the dynamic value automatically adjusts upward until response in the relationship network tree indicates sufficient activity in movement of the product or service.

3. A computer program product comprising a non-transitory computer readable storage medium having computer readable program code embodied therewith, the computer readable program code being configured, when executed by a computer processor, to:
generate a digital dynamic coupon comprising a set of stored rules related to a liability value associated with a movement of a product or service, the set of rules including terms of a contract between an issuer and an agent of a plurality of agents in a supply chain relationship of the product or service and defining a dynamic value of the digital dynamic coupon associated with the product or service, wherein the dynamic value automatically adjusts according to the rules when an incentive for the digital dynamic coupon does not generate a minimum threshold of change in movement of the product or service, wherein the dynamic value is capable of being loaded or adjusted by two or more of the plurality of agents, wherein the plurality of agents hold different positions in a flow of the product or service from manufacturing to a sale of the product or service to an end consumer;
configure using blockchain, by the computer processor, a token tree to map a virtual representation of a supply chain agent relationship infrastructure for the plurality of agents in a relationship network tree and allows to track activity throughout the token tree and to identify dynamic coupons within the token tree;
identify, by the computer processor, an event performed by the agent related to the movement of the product or service, the event defined as satisfying one criteria within the set of rules;
modify, by the computer processor, the liability value of the digital dynamic coupon in response to the identified event; and
broadcast, by a host server, to a relationship network tree having a plurality of agents connected to the supply chain relationship, the modified liability value associated with the digital dynamic coupon, wherein the plurality of agents hold different positions in a flow of the product or service from manufacturing to a sale of the product or service,
wherein based on agent instructions from an agent of the plurality of agents, the host server increases the modified liability value of the digital dynamic coupon through the host server to incentivize down-stream agent behavior in the relationship network tree;
wherein based on down-stream agent instructions from a down-stream agent, the host server further increases the modified liability value of the digital dynamic coupon to incentivize a consumer to purchase the product or service;
wherein the distributed ledger network tracks electronically a commercial activity of the agent and the down-stream agent using the token tree;
wherein broadcasting the modified liability value includes instantly broadcasting the further increased liability value of the digital dynamic coupon to the relationship network tree so that the agents have up-to-date value information of the digital dynamic coupon;
wherein modifying the liability value of the digital dynamic coupon includes automatically destroying one or more associated tokens in the distributed ledger network when availability of the product or service reaches a threshold;
wherein the system provides a multidirectional incentive program that includes upstream and downstream agents, which add values to the digital wallet; and wherein the plurality of agents are upstream or downstream of each other in the flow of the product or service from manufacturing to sale to an end consumer and a liability value of a digital dynamic coupon for an agent upstream of other agents is an aggregate of values for digital dynamic coupons associated with the other agents.

4. The computer program product of claim 3, wherein the network tree is an electronic distributed ledger.

5. The computer program product of claim 3, wherein any agent in the network tree may load a reward value to the liability value of the dynamic coupon.

6. The computer program product of claim 3, wherein the liability value automatically adjusts upward until response in the network tree indicates sufficient activity in movement of the product or service.

\* \* \* \* \*